United States Patent
Smiljanovski et al.

(10) Patent No.: US 9,644,529 B2
(45) Date of Patent: May 9, 2017

(54) SUPERCHARGED INTERNAL COMBUSTION ENGINE WITH TWIN-FLOW TURBINE AND METHOD FOR OPERATING AN INTERNAL COMBUSTION ENGINE OF SAID TYPE

(71) Applicant: Ford Global Technologies, LLC, Dearborn, MI (US)

(72) Inventors: Vanco Smiljanovski, Bedburg (DE); Helmut Matthias Kindl, Aachen (DE); Uwe Spaeder, Langenargen (DE); Rob Stalman, Selfkant (DE)

(73) Assignee: Ford Global Technologies, LLC, Dearborn, MI (US)

( * ) Notice: Subject to any disclaimer, the term of this patent is extended or adjusted under 35 U.S.C. 154(b) by 583 days.

(21) Appl. No.: 14/153,937

(22) Filed: Jan. 13, 2014

(65) Prior Publication Data

US 2014/0196696 A1 Jul. 17, 2014

(30) Foreign Application Priority Data

Jan. 17, 2013 (DE) ........................ 10 2013 200 671

(51) Int. Cl.
| | | |
|---|---|---|
| *F02D 23/00* | (2006.01) | |
| *F02B 33/00* | (2006.01) | |
| *F02B 37/00* | (2006.01) | |
| *F02B 37/24* | (2006.01) | |
| *F01D 17/16* | (2006.01) | |

(52) U.S. Cl.
CPC ............ *F02B 33/00* (2013.01); *F01D 17/165* (2013.01); *F02B 37/002* (2013.01); *F02B 37/24* (2013.01); *F05D 2220/40* (2013.01); *Y02T 10/144* (2013.01)

(58) Field of Classification Search
CPC ...... F01D 17/165; F02B 33/00; F02B 37/002; F02B 37/24; F05D 2220/40; Y02T 10/144
See application file for complete search history.

(56) References Cited

U.S. PATENT DOCUMENTS

| | | | | |
|---|---|---|---|---|
| 5,092,126 A | * | 3/1992 | Yano | ..................... F01D 17/146 415/164 |
| 6,672,061 B2 | * | 1/2004 | Schmid | ................... F02B 37/02 123/568.17 |
| 7,828,517 B2 | | 11/2010 | Serres | |
| 2012/0159946 A1 | * | 6/2012 | Sauerstein | .............. F01D 9/026 60/598 |

FOREIGN PATENT DOCUMENTS

| | | | | |
|---|---|---|---|---|
| DE | 10318737 A1 | * | 11/2004 | ............ F02B 37/025 |
| DE | 102009012130 A1 | | 9/2010 | |
| JP | 2009144664 A | | 7/2009 | |

* cited by examiner

*Primary Examiner* — Jesse Bogue
*Assistant Examiner* — Matthew T Largi
(74) *Attorney, Agent, or Firm* — Julia Voutyras; McCoy Russell LLP

(57) ABSTRACT

A supercharged internal combustion engine may include a twin-flow turbine with variable vane geometry. One example method to operate the device permits optimized operation of the internal combustion engine at low exhaust gas flow rates.

15 Claims, 5 Drawing Sheets

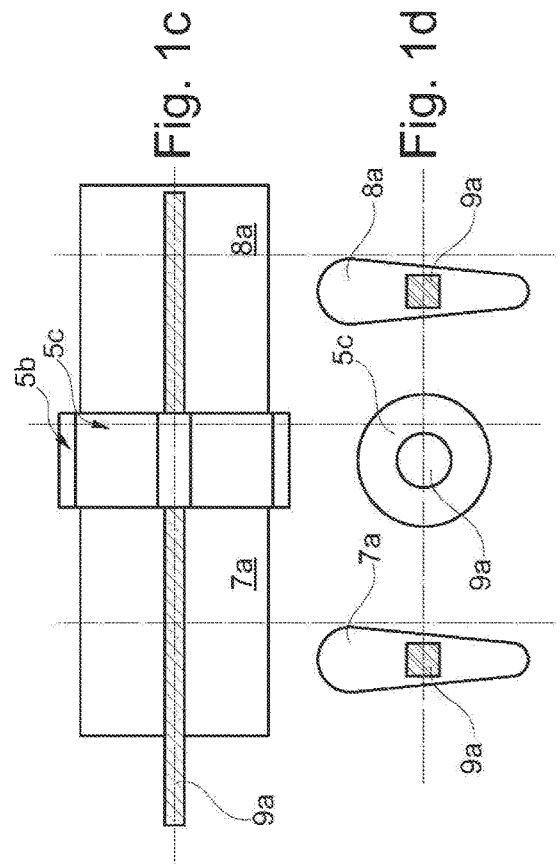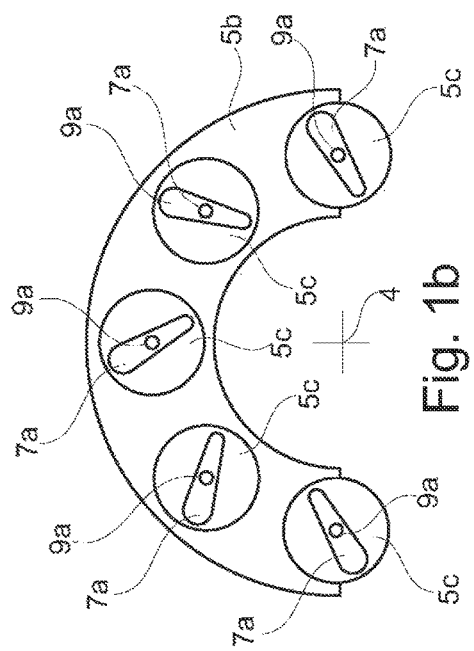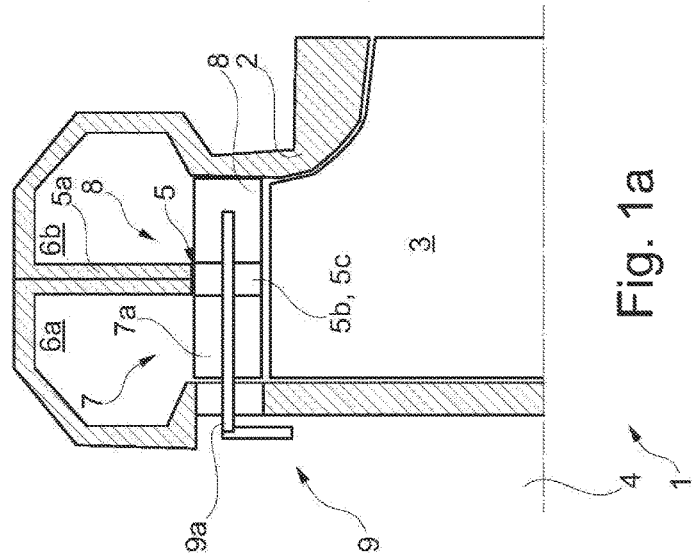

SUPERCHARGED INTERNAL COMBUSTION ENGINE WITH TWIN-FLOW TURBINE AND METHOD FOR OPERATING AN INTERNAL COMBUSTION ENGINE OF SAID TYPE

CROSS REFERENCE TO RELATED APPLICATIONS

The present application claims priority to German Patent Application No. 102013200671.3, filed on Jan. 17, 2013, the entire contents of which are hereby incorporated by reference for all purposes.

BACKGROUND/SUMMARY

Internal combustion engines comprising a turbocharger or a supercharger have an exhaust manifold in which the exhaust lines of the cylinders are grouped in the internal combustion engine. The turbine of the supercharger is provided in the exhaust-gas discharge system. Impulse supercharging at low loads and/or low speeds may increase the turbine rotational speed which can fall during idle operation and/or low load.

One solution to increase turbine rotational speed is to group the cylinders to form the exhaust manifold. This limits the number of turbines and increases the frequency of the pulses that supply each turbine. In another solution a twin-flow turbine may be used such that the rotor is supplied by two adjacent twin exhaust volutes. Further a variable nozzle turbine wherein the nozzle vanes are attached to an axially movable wall to adjust the width of the inlet passageway may be used to optimize gas flow to the rotor.

Some of the problems recognized by the inventors with such set-ups come when running near idle or low load. Grouped cylinders should be set for specific engine types or the pressure fluctuations in the exhaust lines may attenuate one another. The tangential speed of the exhaust gases at the inlet of the rotor may vary greatly with the supply pressures of the two volutes in a twin-flow turbine. The nozzle vanes in a variable nozzle turbine can become jammed or experience reduced movement over their lifetime. Further, leakage of gases from the low pressure side of the nozzle vanes may occur.

One solution relates to a supercharged internal combustion engine having at least one cylinder head with at least two cylinders comprising each cylinder has at least one outlet opening for discharging the exhaust gases out of the cylinder via an exhaust-gas discharge system, and each outlet opening is adjoined by an exhaust line wherein at least two cylinders are configured in such a way as to form two groups with in each case at least one cylinder and the exhaust lines of the cylinders of each cylinder group merge in each case to form an overall exhaust line such that an exhaust manifold is formed. Further the two overall exhaust lines are connected to a two-channel turbine which comprises a rotor which is mounted on a rotatable shaft in a turbine housing such that in each case one overall exhaust line is connected to one of the two inlet openings of the two-cannel turbine and the two channels are separated from one another as far as the rotor by means of a wall such that the streams of the two channels are conducted separate from one another to the rotor. The two-channel turbine comprises a first group of adjustable guide blades at the rotor end of the first channel and a second group of adjustable guide blades at the rotor end of the second channel. In this way it is possible to optimize the configuration of the cylinders to decrease attenuation in the exhaust lines and reduce the potential issues with the nozzle vanes.

Another solution involves a method for operating a supercharged internal combustion engine including a turbine wherein a first group of adjustable guide blades is provided at a rotor side end of a first channel and a second group of adjustable guide blades is provided at a rotor side end of a second channel. This method may reduce variations in the tangential speed of the exhaust gases at the inlet of the rotor.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1a schematically shows the basic construction of a twin-flow turbine according to a first embodiment in a half-section along the axis of rotation of the rotor.

FIG. 1b schematically shows the ring together with guide blades and adjustment mechanism of the twin-flow turbine illustrated in FIG. 1a, in a split side view.

FIG. 1c schematically shows the ring illustrated in FIG. 1b together with guide blades and adjustment mechanism, sectioned along the axis of rotation of a rod of the adjustment mechanism.

FIG. 1d schematically shows two guide blades and a disk sectioned transversely with respect to the axis of rotation of a rod of the adjustment mechanism.

DETAILED DESCRIPTION

Figure 2:
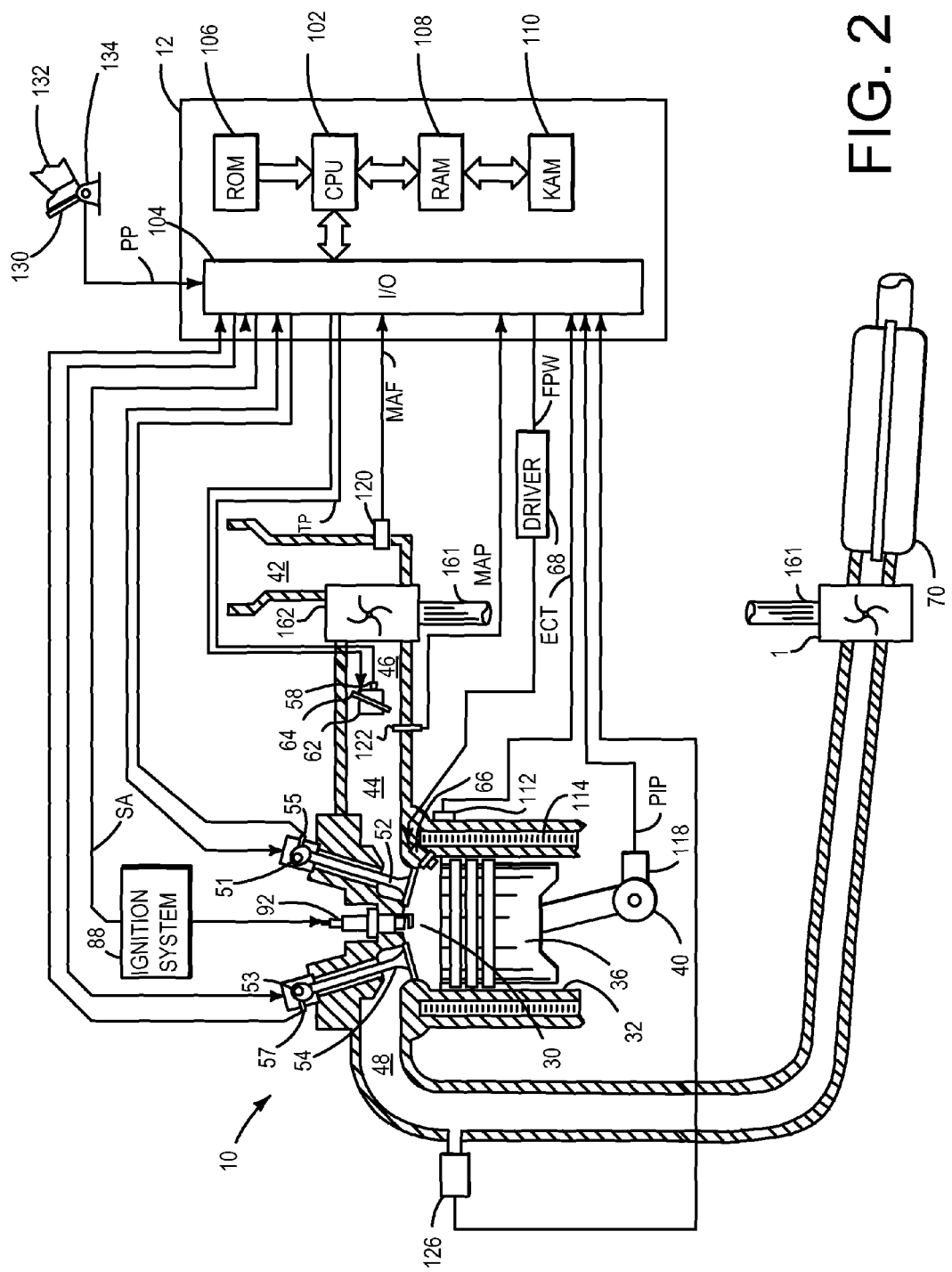
FIG. 2 schematically shows a depiction of an internal combustion engine.

The present application relates to a supercharged internal combustion engine having at least one cylinder head with at least two cylinders, in which
   each cylinder has at least one outlet opening for discharging the exhaust gases out of the cylinder via an exhaust-gas discharge system, and each outlet opening is adjoined by an exhaust line,
   at least two cylinders are configured in such a way as to form two groups with in each case at least one cylinder,
   the exhaust lines of the cylinders of each cylinder group merge in each case to form an overall exhaust line such that an exhaust manifold is formed, and
   the two overall exhaust lines are connected to a two-channel turbine, which comprises a rotor which is mounted on a rotatable shaft in a turbine housing, such that in each case one overall exhaust line is connected to one of the two inlet openings of the turbine, wherein each inlet opening is adjoined by one channel of the turbine and the two channels are separated from one another as far as the rotor by means of a wall, such that the exhaust-gas streams of the two channels are conducted separate from one another to the rotor.

The application also relates to a method for operating an internal combustion engine of said type.

The expression "internal combustion engine" encompasses in particular Otto-cycle engines but also diesel engines and hybrid internal combustion engines, that is to say internal combustion engines which are operated using a hybrid combustion process.

Internal combustion engines have a cylinder block and a cylinder head which are connected to one another to form the cylinders. The cylinder head conventionally serves to hold the valve drive. To control the charge exchange, an internal combustion engine requires control elements—generally in the form of valves—and actuating devices for actuating these control elements. The valve actuating mechanism required for the movement of the valves, including the valves themselves, is referred to as the valve drive. During the charge exchange, the combustion gases are discharged via the outlet openings of the at least two cylinders, and the charging of the combustion chambers, that is to say the induction of fresh mixture or charge air, takes place via the inlet openings.

According to the prior art, the exhaust lines which adjoin the outlet openings are at least partially integrated in the cylinder head and are merged to form a common overall exhaust line or in groups to form two or more overall exhaust lines. The merging of exhaust lines to form an overall exhaust line is referred to generally as an exhaust manifold.

The way in which the exhaust lines of the cylinders are merged in the specific situation, that is to say the specific configuration of the exhaust-gas discharge system, is dependent substantially on the operating ranges for which the operating behavior of the internal combustion engine is to be optimized.

In the case of supercharged internal combustion engines in which at least one turbine of an exhaust-gas turbocharger is provided in the exhaust-gas discharge system and which are intended to exhibit satisfactory operating behavior, in particular satisfactory supercharging behavior, in the lower engine speed and/or load range, that is to say in the case of relatively low exhaust-gas flow rates, so-called impulse supercharging is desired, that is to say preferable.

Here, the dynamic wave phenomena which occur in the exhaust-gas discharge system—in particular during the charge exchange—should be utilized for the purpose of supercharging and for improving the operating behavior of the internal combustion engine.

The evacuation of the combustion gases out of a cylinder of the internal combustion engine during the charge exchange is based substantially on two different mechanisms. When the outlet valve opens close to bottom dead center at the start of the charge exchange, the combustion gases flow at high speed through the outlet opening into the exhaust-gas discharge system on account of the high pressure level prevailing in the cylinder at the end of the combustion and the associated high pressure difference between the combustion chamber and exhaust line. Said pressure-driven flow process is assisted by a high pressure peak which is also referred to as a pre-outlet shock and which propagates along the exhaust line at the speed of sound, with the pressure being dissipated, that is to say reduced, to a greater or lesser extent with increasing distance traveled as a result of friction.

During the further course of the charge exchange, the pressures in the cylinder and in the exhaust line are equalized, such that the combustion gases are no longer evacuated primarily in a pressure-driven manner but rather are discharged as a result of the reciprocating movement of the piston.

At low loads or engine speeds, that is to say low exhaust-gas flow rates, the pre-outlet shock may advantageously be utilized for impulse supercharging, as a result of which it is possible to obtain high turbine pressure ratios even at low turbine rotational speeds. In this way, it is possible by means of exhaust-gas turbocharging to generate high charge-pressure ratios, that is to say high charge pressures on the inlet side, even in the case of only low exhaust-gas flow rates, that is to say at low loads and/or low engine speeds.

Impulse supercharging has proven to be particularly advantageous for accelerating the turbine rotor, that is to say for increasing the turbine rotational speed, which can fall to a noticeable extent during idle operation of the internal combustion engine or at low load, and which should frequently be increased again with as little delay as possible by means of the exhaust-gas flow in the event of an increased load demand. The inertia of the rotor and the friction in the shaft bearing arrangement generally slow an acceleration of the rotor to higher rotational speeds and therefore hinder an immediate rise in the charge pressure.

To be able to utilize the dynamic wave phenomena occurring in the exhaust-gas discharge system, in particular the pre-outlet shocks, for the impulse supercharging for improving the operating behavior of the internal combustion engine, the pressure peaks or pre-outlet shocks in the exhaust-gas discharge system must be maintained. It is particularly advantageous if the pressure fluctuations are intensified in the exhaust lines, but at least do not attenuate one another or cancel one another out.

It is therefore expedient for the cylinders to be grouped, that is to say for the exhaust lines to be merged, in such a manner that the high pressures, in particular the pre-outlet shocks of the individual cylinders, in the exhaust-gas discharge system are maintained.

The subject matter of the present application also encompasses an internal combustion engine in which the cylinders are grouped. At least two cylinders are configured in such a way as to form two groups with in each case at least one cylinder. The exhaust lines of the cylinders of each cylinder group merge in each case to form an overall exhaust line such that an exhaust manifold is formed, wherein, each overall exhaust line is connected to one channel of a two-channel turbine. In this way, the exhaust-gas streams of the two cylinder groups are kept separate from one another as far as the rotor. Here, the cylinders are preferably configured in such a way that the dynamic wave phenomena in the exhaust lines of the cylinders of a group have the least possible adverse effect on one another.

In a cylinder head having four cylinders in an in-line arrangement, it is advantageous in this regard for two cylinders which have an ignition interval of 360° C.A to be combined in each case to form a cylinder group. For example, if the ignition in the cylinders is initiated in accordance with the ignition sequence 1-2-4-3 or in accordance with the ignition sequence 1-3-4-2, it is advantageous for the outer cylinders to be combined to form a first group and for the inner cylinders to be combined to form a second group.

The above-described grouping of the cylinders or the configuration of the exhaust-gas discharge system has further advantages, in particular with regard to the charge exchange. The pressure waves originating from a cylinder run in the exhaust-gas discharge system not only through the at least one exhaust line of said cylinder but also along the exhaust lines of the other cylinders, specifically possibly as far as the outlet opening provided at the end of the respective line. Exhaust gas which has already been expelled or discharged into an exhaust line during the charge exchange can thus pass back into the cylinder again, specifically as a result of the pressure wave originating from another cylinder. In particular, it has proven to be disadvantageous if, toward the end of the charge exchange, positive pressure prevails at the outlet opening of a cylinder or the pressure wave of another cylinder propagates along the exhaust line in the direction of the outlet opening, as this counteracts the evacuation of the combustion gases out of said cylinder. Specifically, in said phase of the charge exchange, the combustion gases are discharged primarily owing to the reciprocating movement of the piston. In individual situations, it may even be the case that exhaust gas originating from one cylinder passes into another cylinder before the outlet thereof closes. The impaired charge exchange leads to disadvantages, in particular under increasing load and with increasing engine speed. The exhaust gas situated in the cylinder, that is to say the residual gas fraction remaining in the cylinder, has a significant influence on the knocking behavior of an applied-ignition internal combustion engine, wherein the risk of knocking combustion rises with increasing exhaust-gas fraction.

With regard to the above described residual gas problem, it may therefore likewise be advantageous for the cylinders to be grouped. In the case of a four-cylinder in-line engine, for example, the above described grouping in which the outer cylinders form a group and the inner cylinders form a group may be advantageous. Since, in the case of the ignition sequence as mentioned by way of example, the two cylinders of a group have an ignition interval of 360° C.A, the cylinders of a cylinder group cannot adversely influence one another during the charge exchange, because the opening duration of an outlet valve is less than the ignition interval of 360° C.A, such that the outlet opening of one cylinder is already closed again before the outlet opening of the other cylinder opens.

Nevertheless, there is a demand for further improved supercharging concepts, in particular for applied-ignition Otto-cycle engines in which the exhaust-gas flow rate is dependent not only on the engine speed but also, owing to the quality regulation that is used, on the load. Concepts are required with which high charge pressures can be provided, that is to say generated, on the inlet side even in the case of extremely low exhaust-gas flow rates, that is to say at low engine speeds and simultaneously at low loads.

Against the background of that stated above, it is an object of the present application to provide a supercharged internal combustion engine according to the preamble of claim 1 which permits an optimized operation in the case of extremely low exhaust-gas flow rates.

It is a further sub-object of the present application to specify a method for operating an internal combustion engine of said type.

The first sub-object is achieved by means of a supercharged internal combustion engine having at least one cylinder head with at least two cylinders, in which
  each cylinder has at least one outlet opening for discharging the exhaust gases out of the cylinder via an exhaust-gas discharge system, and each outlet opening is adjoined by an exhaust line,
  at least two cylinders are configured in such a way as to form two groups with in each case at least one cylinder,
  the exhaust lines of the cylinders of each cylinder group merge in each case to form an overall exhaust line such that an exhaust manifold is formed, and
  the two overall exhaust lines are connected to a two-channel turbine, which comprises a rotor which is mounted on a rotatable shaft in a turbine housing, such that in each case one overall exhaust line is connected to one of the two inlet openings of the turbine, wherein each inlet opening is adjoined by one channel of the turbine and the two channels are separated from one another as far as the rotor by means of a wall, such that the exhaust-gas streams of the two channels are conducted separate from one another to the rotor,
and wherein
  a first group of adjustable guide blades is provided at the rotor-side end of the first channel, and a second group of adjustable guide blades is provided at the rotor-side end of the second channel.

The internal combustion engine has a two-channel turbine in which each channel is equipped, at its rotor-side end, with an adjustable guide grate, that is to say an adjustable guide wheel, in the form of multiple rotatable guide blades, such that the flow impinging on the rotor can be adjusted in an operating-point-specific manner. The variable geometry of the guide wheel permits an adaptation of the turbine geometry to the present operating point of the internal combustion engine, in particular an adaptation to extremely low exhaust-gas flow rates by adjustment of the guide blades, that is to say of the guide grate, in the direction of a closed position, such that the flow resistance generated by the guide blades is increased.

The two-channel turbine thus has a variable turbine geometry which permits a wide-ranging adaptation to the respective operating point of the internal combustion engine by adjustment of the effective turbine cross section. Here, adjustable guide blades for influencing the flow direction are arranged in the inlet region of the turbine. By contrast to the rotor blades of the rotating rotor, the guide blades do not rotate with the shaft of the turbine, that is to say the guide blades are arranged in a stationary manner in the inlet region.

The first object, specifically that of providing a supercharged internal combustion engine according to the preamble of claim 1 which permits optimized operation in the case of extremely low exhaust-gas flow rates, is thereby achieved.

The wall separates the two channels of the turbine as far as the rotor, wherein the separation or the wall preferably extends to a point as close as possible to the rotor. Here, it must be taken into consideration that the rotor must maintain a sufficient spacing to the wall in order to be able to freely rotate in the turbine housing. At the rotor side, the wall separates the first group of adjustable guide blades from the second group of adjustable guide blades, wherein, as a separating element for separating the guide blade groups, use may also be made of a ring, as will be described in yet more detail in conjunction with the preferred embodiments.

In the internal combustion engine, the exhaust lines of at least two cylinders are merged to form two overall exhaust lines such that two exhaust manifolds are formed. In this respect, embodiments having three, four, five or more cylinders, wherein the exhaust lines of more than two cylinders are merged to form two overall exhaust lines, are likewise internal combustion engines. The internal combustion engine has at least one cylinder head, and may thus also have two cylinder heads.

Further advantageous embodiments of the internal combustion engine will be explained in conjunction with the subclaims.

Embodiments of the supercharged internal combustion engine are advantageous in which a common adjustment mechanism is provided for both guide blade groups, by means of which common adjustment mechanism the guide blades of the two groups can be adjusted simultaneously and in the same direction. A common adjustment of both guide blade groups by means of one mechanism makes the actuation, that is to say the adjustment, of the guide blades considerably easier, and in particular simplifies the control of the adjustment, reduces the costs for the adjustment mechanism, and reduces the overall weight of the mechanism required for both groups. Furthermore, less installation space is taken up if both guide blade groups share a common adjustment mechanism, that is to say only one adjustment mechanism must be arranged in the engine bay.

Embodiments of the supercharged internal combustion engine may however also be advantageous in which, for each guide blade group, there is provided a dedicated adjustment mechanism by means of which the guide blades of one group can be adjusted independently of the guide blades of the other group. A separate adjustment of the two guide grates additionally increases the flexibility and the adaptability of the turbine to different operating conditions of the internal combustion engine. A different adjustment of the two guide blade groups makes it possible to set different flow resistances in the channels, and thus permits a differentiated and targeted distribution of the exhaust-gas stream between the two channels.

It is also possible for one channel to be designed as a switchable channel which is closed, that is to say shut off, by virtue of the associated guide blade group being moved into the closed position or in the direction of the closed position. Here, the guide blade group functions as a shut-off element by means of which the channel can be closed.

It is basically also possible for both channels of the two-channel turbine to be designed as switchable channels.

With regard to the adjustment mechanism, embodiments of the supercharged internal combustion engine are advantageous in which the adjustment mechanism comprises, for the adjustment of a guide blade, at least one rotatable rod on which the guide blade is rotationally conjointly arranged.

A rotatable rod is particularly suitable as a stable supporting structure for holding a guide blade, wherein the guide blade can be adjusted in a simple manner by rotating the rod. For the adjustment of a guide blade, a rotation is particularly advantageous in relation to a displacement, because a rotation through a rotational angle does not take up, that is to say necessitate, any additional installation space in the engine bay, by contrast to a displacement through a displacement travel.

If a common adjustment mechanism is provided, embodiments of the supercharged internal combustion engine are advantageous in which the common adjustment mechanism comprises rotatable rods for the adjustment of the guide blades, wherein the rods extend through the wall and, on each rod, there is rotationally conjointly arranged a guide blade of the first group and a guide blade of the second group.

Embodiments of the supercharged internal combustion engine are advantageous in which the wall which separates the two channels as far as the rotor is a housing wall formed integrally with the turbine housing. An immovable housing wall fixedly connected to the housing ensures adequate stability of the housing and ensures that the heat introduced into the housing wall by the hot exhaust gas is dissipated in an advantageous manner and to a sufficient extent into and via the housing.

In particular, however, embodiments of the supercharged internal combustion engine may also be advantageous in which the wall which separates the two channels as far as the rotor is of modular construction.

Specifically, the modular construction of the wall permits embodiments in which the wall which is of modular construction comprises a ring which is fixedly connected to the turbine housing and which surrounds the rotor and which forms the rotor-side end of the wall. The ring in turn may be formed in an advantageous manner with regard to the guide blade group or the adjustment of the guide blades and may form a part of the adjustment mechanism, as will become clear on the basis of the embodiments below.

If the wall is of modular construction and said wall which is of modular construction has a ring, embodiments are advantageous in which the ring comprises circular disks which are rotatably mounted in a flush manner in circular recesses of the ring, wherein each disk serves to hold at least one guide blade and is rotationally conjointly connected to said guide blade.

By contrast to embodiments in which the guide blades are rotatable relative to the wall or relative to the ring, for which purpose an adequately large spacing, that is to say gap, must be formed between the guide blade and wall or between the guide blade and ring, it is the case in the above embodiment that no gap is formed between a guide blade and the wall or ring, because each guide blade is connected rotationally conjointly, and thus without a gap, to the associated disk. In this respect, it is also the case that no additional flow connection is generated between a channel upstream of the guide blades and the rotor downstream of the guide blades, such that an undesired pressure equalization or pressure dissipation across the guide blades is advantageously prevented.

Embodiments of the internal combustion engine may also be advantageous in which the ring comprises circular disks which are rotatably mounted in a flush manner in circular apertures of the ring, wherein each disk serves to hold a guide blade of the first group and to hold a guide blade of the second group and is rotationally conjointly connected to said two guide blades.

The advantages of this configuration of the guide grate are those which have been mentioned in conjunction with the preceding embodiment. An undesired pressure equalization or pressure dissipation across the guide blades is prevented. The disks which are rotatably mounted in circular apertures are particularly suitable for use of a common adjustment mechanism.

Specifically in the case of supercharged internal combustion engines with a common adjustment mechanism for both guide blade groups, embodiments are advantageous in which the common adjustment mechanism comprises rotatable rods for the adjustment of the guide blades, wherein each rod extends through a disk and is rotationally conjointly connected to said disk.

Embodiments of the supercharged internal combustion engine are advantageous in which the internal combustion engine is an applied-ignition internal combustion engine.

In a non-supercharged internal combustion engine, the exhaust-gas flow rate corresponds approximately to the engine speed and/or load of the internal combustion engine, specifically as a function of the load control used in the individual situation. As already stated, in the case of an applied-ignition Otto-cycle engine, owing to the quantity regulation which is used, the exhaust-gas flow rate varies to a significantly greater extent than in the case of a diesel engine. The exhaust-gas flow rate decreases with falling load even at a constant engine speed, whereas in the case of diesel engines with quality regulation, the exhaust-gas flow rate is dependent merely on engine speed, because in the event of a load shift at constant engine speed, the mixture composition but not the mixture quantity is varied.

In this respect, in particular in the case of an internal combustion engine operated on the basis of quantity regulation, that is to say in the case of an applied-ignition Otto-cycle engine, there is a particular demand for supercharging concepts which are configured and optimized with regard to low and extremely low exhaust-gas flow rates, in order that high charge pressures can be provided on the inlet side even under such operating conditions.

In the case of supercharged internal combustion engines, it must be taken into consideration that the charge pressure on the inlet side may vary with load and/or engine speed, and has an influence on the exhaust-gas flow rate. This fact however does not influence the relationships discussed above with regard to the exhaust-gas flow rate.

Embodiments of the supercharged internal combustion engine are advantageous in which the two channels of the turbine can be connected to one another within the turbine housing by virtue of at least one opening in the wall upstream of the rotor being opened.

In order to make it possible for the turbine provided downstream of the cylinders in the exhaust-gas discharge system to be operated in an optimum manner at high loads or high engine speeds, that is to say in the case of high exhaust-gas flow rates, the turbine should be impinged on with as constant an exhaust-gas stream as possible. To realize so-called ram supercharging, it is necessary for a pressure upstream of the turbine to exhibit little variation. A correspondingly large exhaust-gas volume upstream of the turbine can smooth the pressure pulsations in the exhaust lines. In this respect, the grouping of the cylinders, whereby the exhaust lines are combined in groups, resulting in the volume of the exhaust-gas discharge system upstream of the turbine being divided into a plurality of partial volumes, has proven to be counterproductive.

In the embodiment in question, the volume of the exhaust system communicating with an individual channel of the turbine can be varied, specifically by virtue of the two channels of the turbine being connected or separated.

Consequently, it is also possible for the exhaust-gas volume or the exhaust-gas discharge system upstream of the rotor of the two-channel turbine to be adapted to different operating conditions of the internal combustion engine, in particular to different exhaust-gas flow rates, and optimized in this regard.

In relation to the connection of the two exhaust manifolds of the two cylinder groups such as is known from the prior art, the connection of the two channels of the turbine has the advantage that the opening that connects the exhaust systems of the two cylinder groups is arranged further remote from the outlet openings of the cylinders, whereby the exhaust line distance between a cylinder of one group and a cylinder of the other group is increased. The risk of mutual, in particular adverse influencing during the charge exchange is thereby counteracted. The above-described residual gas problem or knocking problem is likewise alleviated.

The above effects are relevant in particular if the exhaust lines of the cylinders of each cylinder group merge in each case to form an overall exhaust line, such that an exhaust manifold is formed, within the cylinder head, because a connection of the manifolds would result in the realization of a connection situated extremely close to the outlet openings of the cylinders.

Embodiments of the supercharged internal combustion engine are advantageous in which the exhaust lines of the cylinders of each cylinder group merge in each case to form an overall exhaust line, such that two exhaust manifolds are formed, within the cylinder head.

The two-channel turbine provided in the exhaust-gas discharge system may then be arranged very close to the outlet of the internal combustion engine, that is to say close to the outlet openings of the cylinders. This has several advantages, in particular because the exhaust lines between the cylinders and the turbine are shortened.

Since the path to the turbine for the hot exhaust gases is shortened, the volume of the exhaust-gas manifold or of the exhaust-gas discharge system upstream of the turbine also decreases. The thermal inertia of the exhaust-gas discharge system is likewise reduced as a result of the reduction of the mass and the length of the exhaust lines in question.

In this way, the exhaust-gas enthalpy of the hot exhaust gases, which is determined significantly by the exhaust-gas pressure and the exhaust-gas temperature, may be utilized optimally, and a fast response behavior of the turbine ensured.

The proposed measure also results in a compact design of the cylinder head and thus of the internal combustion engine as a whole, and permits dense packaging of the drive unit in the engine bay.

The shortening of the line lengths and the associated reduction in size of the exhaust-gas volume upstream of the turbine assists the impulse supercharging in the low load and rotational speed range.

Exhaust-gas aftertreatment systems possibly provided in the exhaust-gas discharge system downstream of the turbine may likewise be arranged closer to the outlet openings, and reach their operating temperature more quickly after a cold start.

The second sub-object, specifically that of specifying a method for operating a supercharged internal combustion engine of a type described above, is achieved by means of a method in which the guide blades are adjusted in the direction of a closed position if the exhaust-gas flow rate from the two cylinder groups falls below a first predefinable exhaust-gas flow rate.

That which has been stated in connection with the internal combustion engine likewise applies to the method.

In the case of a decreasing exhaust-gas flow rate, the turbine pressure ratio can be increased by adjusting the guide blades in the direction of the closed position, whereby the charge-pressure ratio and thus the charge pressure are also increased. The supercharging characteristics are improved. Even though reference is made in the present case to a closed position, this should not be interpreted as meaning that the guide blades can actually be completely closed and that the corresponding channel is, in effect, closed off in an exhaust-gas-tight manner. The selected wording serves merely to indicate a tendency, that is to say the direction of the adjustment process.

Method variants are advantageous in which the guide blades are adjusted in the direction of an open position if the exhaust-gas flow rate from the two cylinder groups exceeds a second predefinable exhaust-gas flow rate.

In embodiments of the supercharged internal combustion engine in which the two channels of the turbine can be connected to one another within the turbine housing by virtue of at least one opening in the wall upstream of the rotor being opened, method variants are advantageous in which the two channels of the turbine are connected to one another if the exhaust-gas flow rate from the two cylinder groups exceeds a first predefinable exhaust-gas flow rate.

It is however preferable for the two channels to be connected to one another only if the exhaust-gas flow rate from the two cylinder groups exceeds a first predefinable exhaust-gas flow rate and remains higher than said first predefinable exhaust-gas flow rate for a predefinable time period $\Delta t_1$.

The introduction of an additional condition for the connection of the two channels is intended to prevent an excessively frequent mode change between impulse supercharging and ram supercharging, in particular a transition to ram supercharging if the exhaust-gas quantity only briefly exceeds the first predefinable exhaust-gas quantity and then falls again or fluctuates around the first predefinable value for the exhaust-gas quantity, without the exceedance justifying a transition to ram supercharging.

The invention will be described in more detail below on the basis of an exemplary embodiment and FIGS. 1a, 1b, 1c and 1d. In the figures:

FIG. 1a schematically shows the basic construction of a twin-flow turbine 1 according to a first embodiment in a half-section along the axis of rotation 4 of the rotor 3. FIG. 1b schematically shows the ring 5b of said twin-flow turbine 1 together with guide blades 7a, 8a and adjustment mechanism 9, 9a, in a split side view.

The illustrated twin-flow turbine 1 is an example for a two-channel turbine 1, that is to say for a turbine 1 with two channels 6a, 6b, wherein the two channels 6a, 6b are arranged adjacent one another and surround the rotor 3 in spiral fashion at least along an arc-shaped segment. The turbine 1 has a turbine housing 2 in which a rotor 3 is mounted on a rotatable shaft 4.

Each channel 6a, 6b is connected in each case to one exhaust manifold of a cylinder group (not illustrated), wherein the two channels 6a, 6b are separated from one another as far as the rotor 3 by means of a wall 5, such that the exhaust-gas streams of the two channels 6a, 6b are conducted separately from one another to the rotor 3.

In the embodiment illustrated in FIG. 1a, the wall 5 which separates the two channels 6a, 6b as far as the rotor 3 is of modular construction. The wall 5 comprises a housing wall 5a, which is formed integrally with the turbine housing 2, and comprises a ring 5b which is fixedly connected to the turbine housing 2, wherein the ring 5b, which surrounds the rotor 3, forms the rotor-side end of the wall 5.

The illustrated twin-flow turbine 1 is characterized in that a first group 7 of adjustable guide blades 7a is provided at the rotor-side end of the first channel 6a, and a second group 8 of adjustable guide blades 8a is provided at the rotor-side end of the second channel 6b.

The guide blades 7a, 8a of the two groups 7, 8 can be adjusted simultaneously and in the same direction by means of a single mechanism, specifically a common adjustment mechanism 9. As can be seen in particular in FIGS. 1a and 1b, the ring 5b comprises circular disks 5c which are arranged in a flush and rotationally conjoint manner in circular apertures of the ring 5b. The common adjustment mechanism 9 for the adjustment of the blades 7a, 8a of the two groups 7, 8 comprises rotatable rods 9a, wherein each rod 9a extends through a disk 5c and, in so doing, is rotatably mounted in said disk 5c.

FIG. 1c schematically shows the ring 5b together with a disk 5c, with a guide blade 7a of the first group 7, with a guide blade 8a of the second group 8 and with the adjustment mechanism 9, specifically sectioned along the axis of rotation of a rod 9a of the adjustment mechanism 9. Each rod 9a holds a guide blade 7a of the first group 7 and a guide blade 8a of the second group 8, and is connected rotationally conjointly to said two guide blades 7a, 8a. For a rod 9a to firstly be mounted rotatably in a disk 5c and to secondly be connected rotationally conjointly to the guide blades 7a, 8a, the cross section of a rod 9a is circular in the region of a disk 5c and is square in the region of the guide blades 7a, 8a, as can be seen from FIG. 1d, which schematically shows two guide blades 7a, 8a and a disk 5c, each sectioned transversely with respect to the axis of rotation of a rod 9 of the adjustment mechanism.

FIG. 2 schematically shows an internal combustion engine 10 that may be operated with the twin-flow turbine 1. A plurality of cylinders, one cylinder of which is shown in FIG. 2, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valves may be operated by an electrochemically controlled valve coil and armature assembly. The position of intake cam 51 may be determined by exhaust cam sensor 57. Fuel injector 66 is shown positioned to inject fuel directly into cylinder 30, which is known to those skilled in the art as direct injection. Further, fuel may be injected to an intake port. Fuel is delivered by a fuel system (not shown) to fuel injector 66. Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin twin-flow turbine 1 which is coupled to compressor 162 via shaft 161. It will be appreciated that the turbine 1 is generically depicted via a box. As discussed in FIG. 1 the turbine 1 has greater complexity.

Figure 3:
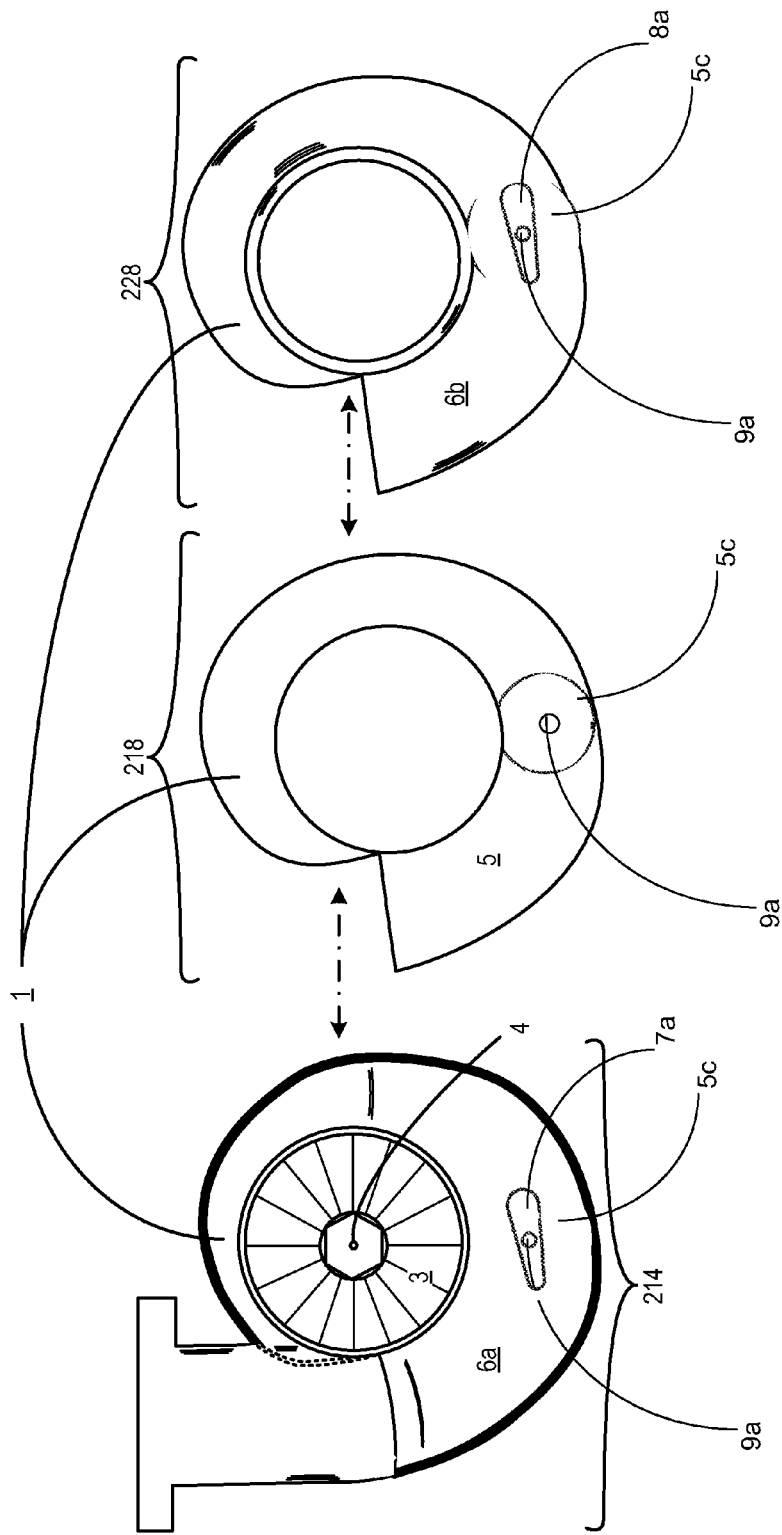
FIG. 3 schematically shows an example of the connection of two guide blades and a disk section in a twin-flow turbine.

Turning to FIG. 3, a schematic is shown of the connection of two guide blades, 7a, 8a, by rod 9a through disk 5c to the common adjustment mechanism 9. In this example, only one guide blade of the two groups 7, 8 is shown. The guide blade 7a is in the first channel 6a with the common rotatable rod 9a wherein the rod 9a extends through the disk 5c which is arranged in a flush and rotationally joint manner in circular apertures of ring 5b, of which the wall 5 is comprised. The rod 9a further extends to the guide blade 8a in the second channel 6b. The rod 9a is controlled by a common adjustment mechanism 9. Each guide blade, 7a, 8a, is connected rotationally conjointly, and thus without a gap, to the associated disk 5c.

The twin flow turbine 1 is shown in three pieces where piece one 214 contains the first channel 6a, piece two 218 contains the wall 5 and piece three 228 contains the second channel 6b.

Figure 4:
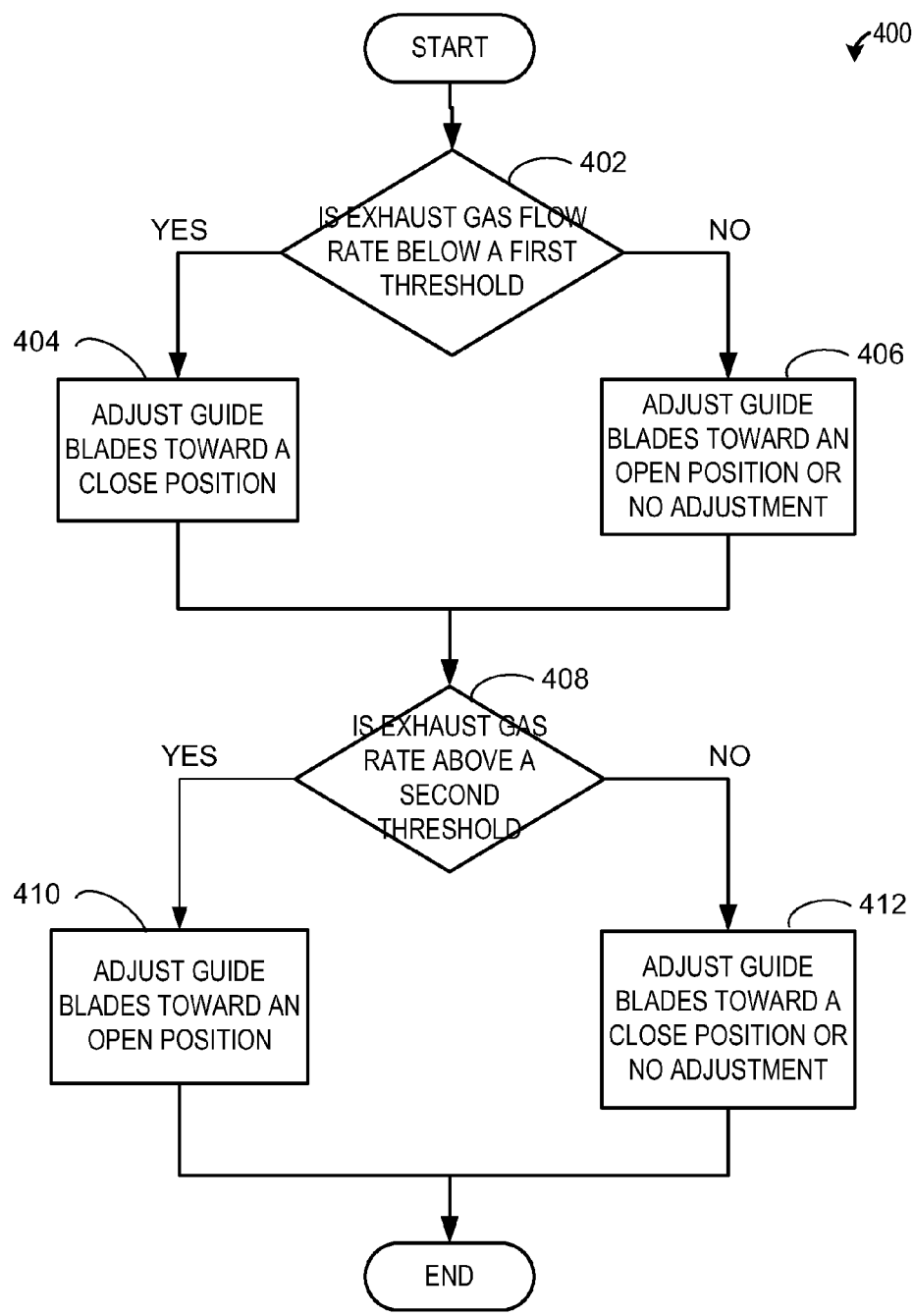
FIG. 4 is an example method for adjusting the guide blades based on exhaust gas flow rate.

Turning to FIG. 4 a method 400 is shown to determine the exhaust gas flow rate and adjust the guide blade groups 7, 8.

At 402, the method may determine if the exhaust gas flow rate is below a first threshold. If yes, the method may proceed to 404 and adjust the guide blade groups 7, 8 toward a closed position. If no, the method may proceed to 406 and adjust the guide blade groups 7, 8 toward an open position or perform no adjustment.

At 408, the method may determine if the exhaust gas flow rate is above a second threshold. If yes, the method may proceed to 410 and adjust the guide blade groups 7, 8 toward an open position. If no, the method may proceed to 412 and adjust the guide blade groups 7, 8 toward a closed position or perform no adjustment.

Figure 5:
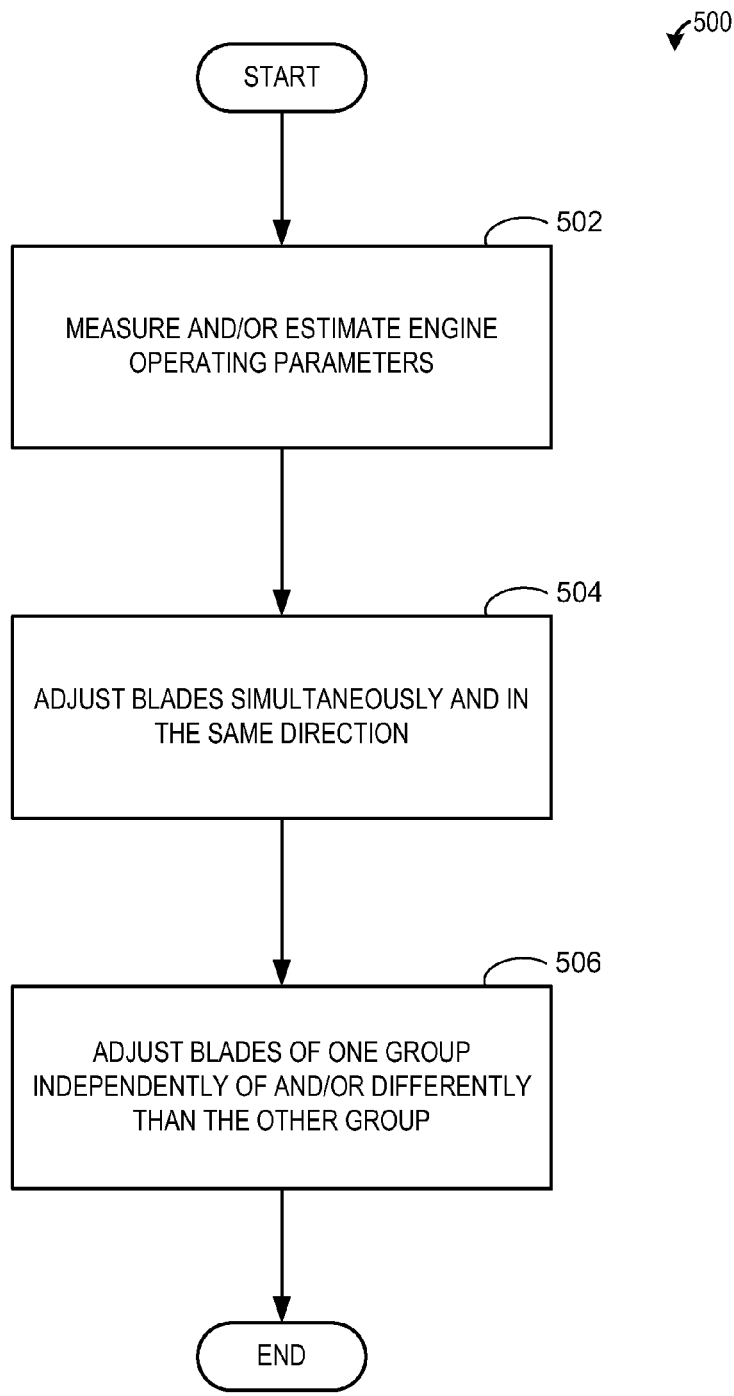
FIG. 5 is an example method for adjusting the guide blades simultaneously and/or independently.

Turning to FIG. 5 a method 500 is shown to determine how the guide blade groups 7, 8 are to be moved based on the engine operating parameters. At 502 the method may measure and/or estimate the engine operating parameters. At 504, the method may determine to move the guide blade groups 7, 8 simultaneously and in the same direction. At 506, the method may determine to move the guide blade groups 7, 8 independently of one another. Further, the guide blade groups 7, 8 may be moved in the same direction or in opposite directions. The method 500 may be used depending upon the adjustment mechanism employed.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

The invention claimed is:

1. A supercharged internal combustion engine having at least one cylinder head with at least two cylinders, comprising:
   each cylinder has at least one outlet opening for discharging the exhaust gases out of the cylinder via an exhaust-gas discharge system, and each outlet opening is adjoined by an exhaust line;
   at least two cylinders are configured in such a way as to form two groups with in each case at least one cylinder;
   the exhaust lines of the cylinders of each cylinder group merge in each case to form two overall exhaust lines such that an exhaust manifold is formed in each case; and
   the two overall exhaust lines are connected to a two-channel turbine, which comprises a rotor which is mounted on a rotatable shaft in a turbine housing, such that in each case one overall exhaust line is connected to one of the two inlet openings of the two-channel turbine, wherein each inlet opening is adjoined by one channel of the two-channel turbine and the two channels are separated from one another as far as the rotor by means of a wall, such that the exhaust-gas streams of the two channels are conducted separate from one another to the rotor;
   wherein a first group of adjustable guide blades is provided at a rotor-side end of the first channel, and a second group of adjustable guide blades is provided at a rotor-side end of the second channel,
   wherein the wall is of a modular construction,
   wherein the wall further comprises a ring which is fixedly connected to the turbine housing and which surrounds the rotor and which forms a rotor-side end of the wall,
   wherein the ring further comprises circular disks which are rotatably mounted in a flush manner in circular recesses of the ring, and
   wherein each disk serves to hold at least one guide blade and is rotationally conjointly connected to said guide blade.

2. The supercharged internal combustion engine as claimed in claim 1, wherein a common adjustment mechanism is provided for both guide blade groups, by means of which common adjustment mechanism the guide blades of the two groups can be adjusted simultaneously and in a same direction,
   wherein the common adjustment mechanism comprises a plurality of rotatable rods, each rod in the plurality of rotatable rods being fixedly mounted to a guide blade in the first group of adjustable guide blades and a guide blade in the second group of adjustable guide blades.

3. The supercharged internal combustion engine as claimed in claim 2, wherein the plurality of rotatable rods are rotationally conjointly arranged on the guide blades.

4. The supercharged internal combustion engine as claimed in claim 2, wherein the plurality of rotatable rods extend through the wall and, on each rotatable rod, there is rotationally conjointly arranged a guide blade of the first group and a guide blade of the second group.

5. The supercharged internal combustion engine as claimed in claim 1, wherein, for the guide blade groups, there is provided a dedicated adjustment mechanism by means of which the guide blades of one group can be adjusted independently of the guide blades of the other group,
   wherein the dedicated adjustment mechanism comprises a plurality of rotatable rods, each rod in the plurality of rotatable rods being fixedly mounted to at least one guide blade in the first group or the second group of adjustable guide blades.

6. The supercharged internal combustion engine as claimed in claim 1, wherein the wall which separates the two channels as far as the rotor is a housing wall formed integrally with the turbine housing.

7. The supercharged internal combustion engine as claimed in claim 1, wherein the ring further comprises circular disks which are rotatably mounted in a flush manner in circular apertures of the ring; and
   wherein each disk serves to hold a guide blade of the first group and to hold a guide blade of the second group and is rotationally conjointly connected to said two guide blades.

8. The supercharged internal combustion engine as claimed in claim 7 comprising a common adjustment mechanism for both guide blade groups; and
   wherein the common adjustment mechanism comprises rotatable rods for the adjustment of the guide blades, wherein each rod extends through a disk and is rotationally conjointly connected to said disk.

9. The supercharged internal combustion engine as claimed in claim 1, wherein the internal combustion engine is an applied-ignition internal combustion engine.

10. The supercharged internal combustion engine as claimed in claim 1, wherein the two channels of the turbine can be connected to one another within the turbine housing by virtue of at least one opening in the wall upstream of the rotor being opened.

11. A method for operating a supercharged engine including a twin flow turbine, comprising:
   adjusting a first group of adjustable guide blades provided at a rotor-side end of a first channel based on operating conditions;
   adjusting a second group of adjustable guide blades provided at a rotor-side end of a second channel based on operating conditions; and
   maintaining a first exhaust stream in the first channel and a second exhaust stream in the second channel separate from each other between the supercharged engine and a rotor of the twin flow turbine,
   wherein maintaining the first and second exhaust streams separate is performed by a wall disposed in a housing of the twin flow turbine, wherein the wall comprises circular disks which are rotatably mounted in a flush manner in circular recesses, and wherein each disk serves to hold at least one guide blade and is rotationally conjointly connected to said guide blade.

12. The method as claimed in claim 11, wherein the adjustable guide blades are adjusted in a direction of a closed position if an exhaust-gas flow rate from the two cylinder groups falls below a first threshold exhaust-gas flow rate.

13. The method as claimed in claim 11, wherein the adjustable guide blades are adjusted in a direction of an open position if an exhaust-gas flow rate from the two cylinder groups exceeds a second threshold exhaust-gas flow rate.

14. The method as claimed in claim 11 further comprising adjusting the first group of adjustable guide blades and the second group of adjustable guide blades simultaneously and in the same direction.

15. The method as claimed in claim 11 further comprising adjusting the first group of adjustable guide blades and the second group of adjustable guide blades independently from each other.

* * * * *

UNITED STATES PATENT AND TRADEMARK OFFICE
CERTIFICATE OF CORRECTION

PATENT NO. : 9,644,529 B2                           Page 1 of 1
APPLICATION NO. : 14/153937
DATED : May 9, 2017
INVENTOR(S) : Vanco Smiljanovski et al.

It is certified that error appears in the above-identified patent and that said Letters Patent is hereby corrected as shown below:

In the Claims

Column 13, Line 34, Claim 1, delete "in each case" immediately prior to "to form two overall exhaust lines".

Column 13, Line 65, Claim 2, delete "common adjustment mechanism" immediately prior to "the guide blades of".

Signed and Sealed this
Tenth Day of October, 2017

Joseph Matal
*Performing the Functions and Duties of the*
*Under Secretary of Commerce for Intellectual Property and*
*Director of the United States Patent and Trademark Office*